United States Patent
Dietrich et al.

(10) Patent No.: US 10,415,998 B2
(45) Date of Patent: Sep. 17, 2019

(54) METHOD FOR OPERATING A ROTATION SENSOR AND CORRESPONDING ROTATION SENSOR

(71) Applicant: Schaeffler Technologies AG & Co. KG, Herzogenaurach (DE)

(72) Inventors: Markus Dietrich, Oberkirch (DE); Oliver Rink, Karlsruhe (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/579,763

(22) PCT Filed: May 23, 2016

(86) PCT No.: PCT/DE2016/200242
§ 371 (c)(1),
(2) Date: Dec. 5, 2017

(87) PCT Pub. No.: WO2016/198062
PCT Pub. Date: Dec. 15, 2016

(65) Prior Publication Data
US 2018/0172477 A1 Jun. 21, 2018

(30) Foreign Application Priority Data
Jun. 10, 2015 (DE) .................. 10 2015 210 586

(51) Int. Cl.
*G01D 5/16* (2006.01)
*G01D 5/14* (2006.01)
*G01D 5/244* (2006.01)

(52) U.S. Cl.
CPC .............. *G01D 5/16* (2013.01); *G01D 5/145* (2013.01); *G01D 5/2449* (2013.01); *G01D 5/24476* (2013.01)

(58) Field of Classification Search
CPC ........ H01L 21/00; H01L 2221/00; G11C 5/00; G11C 2207/00; G01R 1/00
See application file for complete search history.

(56) References Cited

U.S. PATENT DOCUMENTS

| | | | |
|---|---|---|---|
| 6,072,382 A * | 6/2000 | Daughton | B82Y 10/00 |
| | | | 257/E43.004 |
| 2011/0187350 A1* | 8/2011 | Ausserlechner | G01D 5/145 |
| | | | 324/202 |

(Continued)

FOREIGN PATENT DOCUMENTS

| | | |
|---|---|---|
| CN | 102549386 A | 7/2012 |
| CN | 103915233 A | 7/2014 |

(Continued)

OTHER PUBLICATIONS

International Search Report for PCT/DE2016/200242; 3 pgs; dated Aug. 17, 2016 by European Patent Office.

(Continued)

*Primary Examiner* — Jermele M Hollington
*Assistant Examiner* — Temilade S Rhodes-Vivour
(74) *Attorney, Agent, or Firm* — Kevin L. Parks

(57) ABSTRACT

A method for operating a rotation sensor comprising at least four magnetoresistive sensor elements is described. Each sensor element comprises a packet of a ferromagnetic reference layer and a sensitive ferromagnetic layer and a non-magnetic layer separating the reference layer from the sensitive layer. The layers are designed such that the orientation of the magnetization in the respective layer is possible in the longitudinal direction of the layer. The at least one sensor element is formed in a plane in a spiral form with at least one complete winding and the windings are implemented concentrically. The sensor element is bent into a winding in different segments. Adjacent segments enclose (Continued)

an angle between them and each complete winding comprises a predetermined number of segments.

19 Claims, 7 Drawing Sheets

(56) References Cited

U.S. PATENT DOCUMENTS

| | | | | |
|---|---|---|---|---|
| 2012/0212217 A1* | 8/2012 | Engel | ............... | G01R 33/098 324/252 |
| 2014/0070341 A1* | 3/2014 | Beach | ............... | H01L 29/82 257/421 |
| 2014/0111195 A1* | 4/2014 | Kuo | ............... | G01R 33/098 324/252 |
| 2014/0132257 A1* | 5/2014 | Sugano | ............... | G01R 33/093 324/252 |

FOREIGN PATENT DOCUMENTS

| | | |
|---|---|---|
| CN | 204241672 U | 4/2015 |
| DE | 102008063226 A1 | 7/2010 |
| DE | 102010010893 A1 | 9/2010 |
| DE | 102011075306 A1 | 11/2012 |
| EP | 0896207 A1 | 2/1999 |
| WO | 2005106395 A1 | 11/2005 |

OTHER PUBLICATIONS

Hanser Automotive: "Beruhrungsloser Umdrehungszahler", Automotive Komponenten, Jun. 30, 2007, SP055293352, URL: http://www.hanser-automotive.de/filead min/heftarchiv/2004/17357.pdf Seite 3, Absatz "Ermittlung des Absolutwinkels uber mehrere Umdrehungen".
Novotechnik, Siedle Group, "How to Substantially Reduce Encoder Cost While Gaining Functionality With Multi-Turn Rotary Position Sensors".

* cited by examiner

| n | R1 | L1 | R2 | L2 | R3 | L3 | R4 | L4 |
|---|---|---|---|---|---|---|---|---|
| 0 | - | - | - | - | - | - | - | - |
| 0.25 | o | - | - | - | - | - | - | - |
| 0.5 | + | - | - | - | - | - | - | - |
| 0.75 | o | o | - | - | - | - | - | - |
| 1 | - | + | - | - | - | - | - | - |
| 1.25 | o | o | o | - | - | - | - | - |
| 1.5 | + | - | + | - | - | - | - | - |
| 1.75 | o | o | o | o | - | - | - | - |
| 2 | - | + | - | + | - | - | - | - |
| 2.25 | o | o | o | o | o | | | |
| 2.5 | + | - | + | - | + | - | - | - |
| 2.75 | o | o | o | o | o | o | - | - |
| 3 | - | + | - | + | - | + | - | - |
| 3.25 | o | o | o | o | o | o | o | - |
| 3.5 | + | - | + | - | + | - | + | - |
| 3.75 | o | o | o | o | o | o | o | o |
| 4 | - | + | - | + | - | + | - | + |

METHOD FOR OPERATING A ROTATION SENSOR AND CORRESPONDING ROTATION SENSOR

CROSS-REFERENCE TO RELATED APPLICATIONS

This application is the United States National Phase of PCT Appln. No. PCT/DE2016/200242 filed May 23, 2016, which claims priority to German Application No. DE102015210586.5 filed Jun. 10, 2015, the entire disclosures of which are incorporated by reference herein.

TECHNICAL FIELD

The present disclosure concerns a method for operating a rotation sensor and a corresponding rotation sensor based on a magnetoresistive effect. Such sensors are used in many areas in which it is necessary to monitor the rotation of elements. If the rotation sensors can also monitor rotations of more than 360°, they are used as multiturn sensors.

BACKGROUND

Rotating components are used in many areas of technology. It is often necessary to monitor the rotation or the rotary position of said components, for example in the case of actuators or in machine tools, in particular the number of rotations carried out must be determined regularly. Besides a mechanical detection, detection by means of sensors is also known, which is based on the giant magneto resistance of thin films. For example, a system is distributed by Novotechnik Messwertaufnehmer OHG under the name "Novoturn", which can measure angles greater than 360° and which is based on magnetoresistive sensors.

Also in such systems—and also as in other rotation sensors—it is desirable to reference the current position, i.e. the already effected rotation angle.

Thus there is a long-felt need to at least partly overcome the disadvantages known from the prior art and in particular to specify a method for operating a magnetoresistive rotation sensor and a corresponding rotation sensor, with which a suitable readout of the data is possible in a simple manner.

BRIEF SUMMARY

The present disclosure concerns a method for operating a rotation sensor comprising at least four magnetoresistive sensor elements. Each sensor element comprises a packet of a ferromagnetic reference layer and a sensitive ferromagnetic layer and a non-magnetic layer separating the reference layer from the sensitive layer. The layers are designed such that the orientation of the magnetization in the respective layer is possible in the longitudinal direction of the layer. The at least one sensor element is formed in a plane in a spiral form with at least one complete winding and the windings are implemented concentrically. The sensor element is bent into a winding in different segments. Adjacent segments enclose an angle between them and each complete winding comprises a predetermined number of segments.

A domain wall generator is implemented, which is made of a ferromagnetic material with a thickness that allows the free orientation of the magnetization of the domain wall generator. The sensitive layer in a first segment of the sensor element is joined to the domain wall generator. Each sensor element comprises a first electrical connection and a second electrical connection, between which the packet is implemented. The rotation sensor comprises a trigger magnet, which can be turned relative to the sensor element segments in a rotation direction to change the magnetization in the sensitive layer of at least one of the segments, and as a result the magnetization in the sensitive layer of at least one of the sensor elements is changed The sensor elements are connected electrically in series with each other in the form of a strip by means of the connections thereof and a first sensor element, wherein each two adjacent sensor element segments are implemented as a group with two outer electrical connections and a common central electrical connection. One outer electrical connection of the group lies at a first electrical potential and the respective other outer electrical connection of the group lies at a second electrical potential having a defined potential difference from the first electrical potential. The first electrical potential or the second electrical potential is defined as electrical ground and, for all groups of the strip sensor element, a group voltage specific to the respective group is measured between the common central electrical connection and ground. The group voltages of all the groups of the sensor element are recorded for analysis of the state of the rotation sensor.

The sensor element comprises three layers disposed one above the other in a vertical direction. Said layers are in particular thin. "Thin" refers here to the extent of the layers in the vertical direction, in particular the extent lies in the nanometer range. The sensor element also has a longitudinal direction that is oriented at right angles to the vertical direction. In said longitudinal direction, which represents the direction of the extent of the sensor element, the sensor element can be divided into a plurality of segments. Transverse to the longitudinal direction and to the vertical direction, the sensor element comprises a width direction. In said width direction, the sensor element is narrow, in particular in the range from 50 to 400 nanometers.

The corresponding rotation sensor is based on the magnetoresistive effect. The at least one sensor element is designed such that two ferromagnetic layers (the reference layer and the sensitive layer) are separated by a non-magnetic layer and the layers are thin, in particular having layer thicknesses in the nanometer range. In this case, the non-magnetic layer lies flat between the sensitive layer and the reference layer. Said layers are designed in magnetoresistive sensor elements, for example, made so thin and so narrow that the magnetization can be oriented in the longitudinal direction of the sensor element (or opposite thereto). The thicknesses usually lie in the nanometer range, whereas the width of the sensor element lies in the range from 50 to 400 nm [nanometers]. Alternatively, owing to the non-magnetic layer, normal operation can change the magnetization in the sensitive layer. Owing to the giant magneto resistance, however, the electrical resistance of the sensor element depends on the mutual orientation of the magnetization in the magnetic layers. In the case of antiparallel orientation of the magnetization in the reference layer and the sensitive layer, the electrical resistance is higher than for a parallel orientation of the magnetizations. By combining into groups and measuring the group voltage, it is possible to determine the resistance of both segments of the respective group, because the potential drop depends on both resistances.

The term "of spiral form" means in particular that there is a structure with more than one winding, wherein the individual windings comprise similar structures but a different extent. The windings are formed concentrically. Each complete winding comprises a predetermined number of segments, which essentially directly represent sections of the sensor element. Adjacent segments enclose an angle with each other in each case. Example designs include equal angles and the number of segments—n—as four, six or eight. In the case of n segments per winding, the angle size to be detected with the rotation sensor is a:

$$\alpha = \frac{360°}{n}$$

For a winding with n=4, this means an angle size to be detected α=90°, and correspondingly 120° for a winding with three segments, 60° for six segments and 45° for eight segments.

The spiral structure can contain complete windings. It is however also possible that one winding (the innermost or outermost) contains fewer segments than the at least one complete winding.

In this case, the rotation sensor is designed so that in each case the sensitive layer of the first segment of each sensor element is joined to the domain wall generator. In this case, the domain wall generator is understood to be the region that is made of a ferromagnetic material and that is of such dimensions that the magnetization of the domain wall generator can be freely oriented according to an external magnetic field. The magnetization of the domain wall generator is oriented parallel to the magnetic field of the trigger magnet. If the magnetic field of the trigger magnet is oriented in the longitudinal direction of the segment that is joined to the domain wall generator, then re-orientation of the magnetization in said segment occurs in said segment if it was oriented in the opposite direction before the orientation of the magnetic field. The magnetization of the adjacent second segment cannot change because the magnetic field of the trigger magnet cannot be oriented in parallel or antiparallel owing to the angle between the first segment and the second segment. Therefore, between the first and second segments a so-called domain wall is formed between the magnetizations, which travels through the sensor element during further rotations of the trigger magnet, wherein a further domain wall forms in the event of re-orientation of the magnetization of the first segment. The number of segments can be an integral multiple of two.

If the spiral structure of the sensor element comprises only one winding, then a maximum rotation of the trigger magnet of 360° is to be detected. In the case of x complete windings, the total rotation angle of the trigger magnet to be detected is x*360°. In the case of for example 4 windings, a total rotation angle of 1440° can be detected, in the case of 4.5 windings 1620°.

The group voltages can be assigned to three potential levels.

This is in particular the case if identical segments are used. In this case, each individual segment can adopt two identical resistance values for all segments corresponding to a parallel or antiparallel orientation of the magnetizations in the sensitive layer and the reference layer. In this case, in a group of two segments, owing to the potential drop from the central electrical connection, in the case of known possible resistances of the individual segments both resistances of the segments can be deduced. The resistances of the individual segments of the group are thus clear with the measurement of a potential drop per group. A resistance measurement of the segments can thus be carried out simply and reliably.

According to an embodiment, the group voltages of all groups are compared with a specifiable reference schema in order to read out the rotation angle of the trigger magnet.

Owing to the rotation of the trigger magnet, there is a change in the magnetization in the sensitive layer and the formation of the domain walls separating the different orientations of the magnetization (in the longitudinal direction/opposite to the longitudinal direction), which are transported through the sensor element as the rotation sensor continues operating. Considering all windings, for each specific rotation angle, i.e. for a quadrangle as the basic form of the spiral-like structure for example at rotation angles of the trigger magnet of 90°, 180°, 270°, 360°, 450°, 540°, etc., in each case there is a uniquely assignable magnetization in the sensitive layer of the individual segments, so that as a result it is possible to determine the rotation angle of the trigger magnet in integer multiples of the angle size a to be detected simply and rapidly from the measured group voltages of the individual groups by comparison with a reference schema.

According to an embodiment, an error signal is output if there is at least one group voltage that indicates a measurement error.

As already described above, for each rotation angle of the trigger magnet in integer multiples of the angle size a to be detected there is a defined schema of the magnetizations in the sensor element and hence also a defined schema of the resistances in the segments of the sensor element. Furthermore, based on the described measurement principle of the rotation sensor, it is also known that certain sequences of magnetizations cannot physically occur, because for example at a certain point no domain wall can exist between adjacent segments at said rotation angle and hence certain magnetizations and, consequently, certain resistances in certain groups of the sensor element cannot occur without an error having occurred. In such a case, an error signal is output, for example a corresponding notice to the user of the rotation sensor, for example to the driver of a motor vehicle, for example by activating a LED or similar. Alternatively or additionally, resetting the rotation sensor to the correct value can be triggered.

According to an embodiment, it is evaluated as to whether the group voltages contain at least one error voltage.

Owing to the known measurement principle, it is clear that in normal operation certain group voltages cannot occur. If there is such a group voltage, likewise an error signal can be triggered. Alternatively or cumulatively, resetting the rotation sensor to the correct value can be triggered.

According to an embodiment, at least one winding comprises a number of segments that is an integral multiple of four.

In the context of this text, an integer multiple also means the product with the number 1, so that integer multiples of four thus also include four, eight, twelve, sixteen, etc. In particular, an embodiment with four segments in at least one or a number of windings permits quarter turns of the trigger magnet to be monitored. Complete windings may comprise a number of segments that is an integral multiple of four.

According to an embodiment, the rotation angle of a second rotation sensor that can detect rotations up to 360° are recorded and correlated with the group voltages that are present.

Thus, for example, using the group voltages a number of rotations of n=1.25 can be obtained. Said information is now correlated with a rotation angle obtained by the second rotation sensor (a so-called single turn sensor), thus for example an error can be detected if the second rotation sensor indicates a position corresponding to 180° (i.e. n=0.5, 1.5, 2.5, etc.). If, however, there is a rotation angle of 90° from the second rotation sensor (i.e. n=0.25, 1.25, 2.25, etc.) then the correlation does not indicate a present error.

According to a further aspect of the present invention, a rotation sensor is proposed that comprises at least one magnetoresistive sensor element, wherein each sensor element comprises a packet of a ferromagnetic reference layer and a sensitive ferromagnetic layer and a non-magnetic layer separating the reference layer from the sensitive layer, wherein the layers are designed such that the orientation of the magnetization in the respective layer is possible in the longitudinal direction of the layer, wherein the at least one sensor element is implemented in a plane in a spiral form with at least one complete winding, wherein the windings are formed concentrically, wherein the sensor element is bent into a winding in different segments, wherein adjacent segments enclose an angle with each other and each complete winding comprises a predetermined number of segments, wherein a domain wall generator is implemented that is made of a ferromagnetic material with a thickness that enables the free orientation of the magnetization of the domain wall generator, wherein the sensitive layer is joined to the domain wall generator in a first segment of the sensor element, wherein the rotation sensor comprises a trigger magnet that can be turned relative to the segments in a rotation direction to change the magnetization in the sensitive layer of at least one of the segments, wherein each two adjacent segments are implemented as a group with two outer electrical connections and a common central electrical connection, wherein one outer electrical connection of the group lies at a first electrical potential and the respective other outer electrical connection of the group lies at a second electrical potential with a defined potential difference from the first electrical potential, wherein the first electrical potential or the second electrical potential is defined as electrical ground, wherein for all groups of the sensor element a group voltage that is specific to the respective group can be measured between the common central electrical connection and the ground by at least one voltage measurement unit, furthermore comprising an analysis device that is suitable and defined for analysis of the state of the rotation sensor based on the group voltages of all groups of the sensor element.

The analysis device can implement the method according to the present disclosure.

According to an embodiment, at least one winding is implemented that comprises a number of segments that is an integral multiple of four and in particular is four. This enables quarter turns of the trigger magnet relative to the sensor element to be detected. A design is suggested with which all windings comprise an identical number of segments that is an integral multiple of four, but also designs according to the present disclosure with which a winding comprises a different number of segments, for example the outermost or innermost winding. In this case, in effect an incomplete winding exists in addition to one or more complete windings. This enables the total number of the rotations to be detected to differ from multiples of 360° if this is desired or necessary.

According to an embodiment, the trigger magnet can be rotated about an axis of rotation and either the rotation sensor is disposed so that the axis of rotation passes through the rotation sensor, in particular there is a coaxial orientation of the axis of rotation and the rotation sensor, or the rotation sensor is disposed outside the axis of rotation.

Here the axis of rotation means the axis—an imaginary line—about which the trigger magnet rotates. The rotation sensor is attached above or below the trigger magnet in the direction of the axis of rotation, wherein the axis of rotation of the trigger magnet either intersects ("on axis") or the axis of rotation lies next to the trigger magnet ("off axis"). An example coaxial embodiment includes the axis of rotation passing through the centre point of the rotation sensor.

According to an embodiment, the rotation sensor comprises a second rotation sensor that can detect rotations up to 360° and that is connected to the analysis device by means of at least one signal line.

The details and advantages disclosed for the method according to the present disclosure can be transferred and applied to the rotation sensor according to the present disclosure and vice-versa. The features individually mentioned in the claims can be combined with each other in any technologically meaningful manner and can be supplemented by explanatory facts from the description and details from the figures, wherein further embodiment versions of the present disclosure are indicated.

BRIEF DESCRIPTION OF THE DRAWINGS

The present disclosure and the technical environment are described in detail below using the figures. The figures show in particular exemplary embodiments, to which the present disclosure is not limited, however. In particular, it is to be noted that the figures and in particular the represented size ratios are only schematic. The same reference characters denote the same objects. In the figures:

FIG. 9 shows a reference schema for the example of FIGS. 1 through 8;

DETAILED DESCRIPTION

Figure 1:
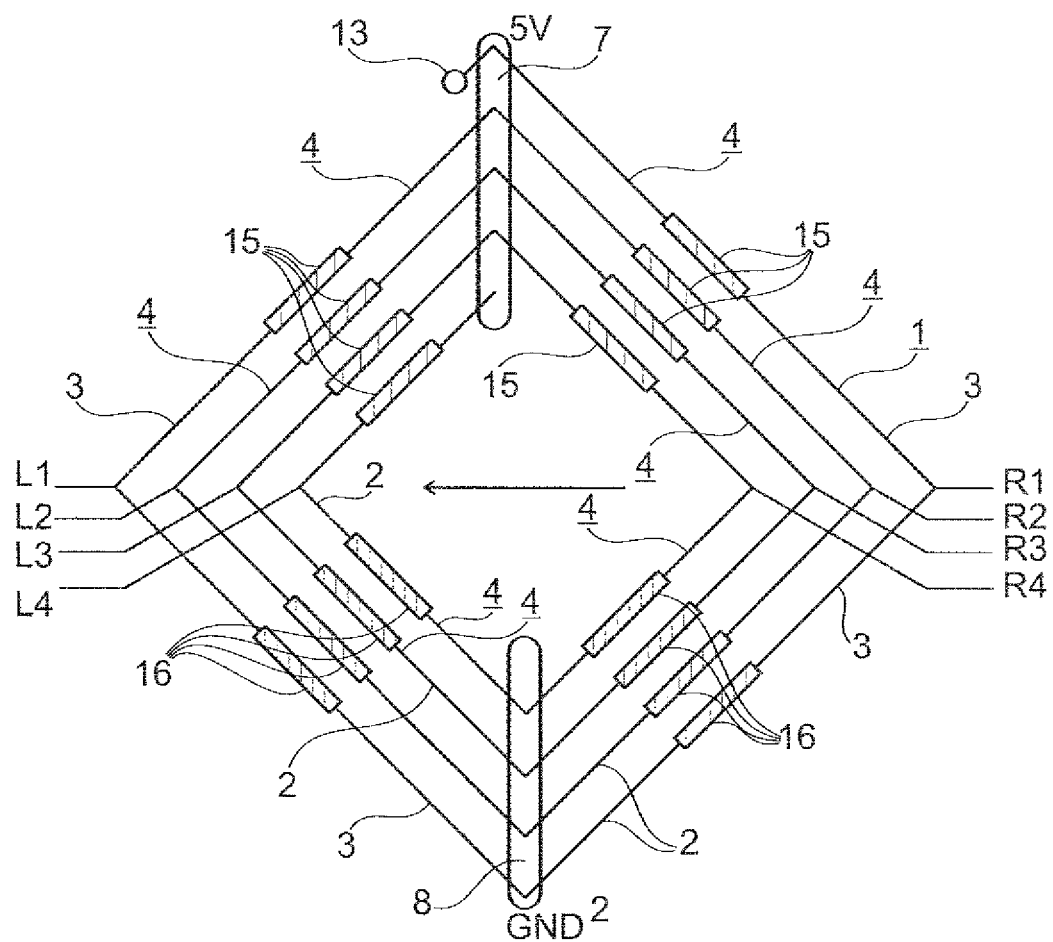
FIG. 1 shows a schematic image of a sensor element.

FIG. 1 shows an image of a sensor element 1 in a schematic form. The sensor element 1 is wound in a plane in a spiral form and comprises four windings 2 that are nested within each other and are concentric. Each winding 2 comprises four segments 3, wherein the angles between two adjacent segments are identical. Each two segments 3 together form a group 4. Each group 4 has two outer electrical connections 5 and a common central electrical connection 6. In each case, an outer electrical connection 5 lies at a first electrical potential 7, the respective other outer electrical connection 5 lies at a second electrical potential 8. First 7 and second 8 electrical potentials comprise a defined potential difference that is 5 V [Volt] in the present example. The second electrical potential 8 is defined as ground (GND), whereas the first electrical potential 7 lies at 5 V. For reasons of clarity, the central electrical connections 6 and the outer electrical connections 5 are only provided with reference characters by way of example, whereas the central electrical connections are also denoted by R1 through R4 and L1 through L4. In this case, R1 and L1 lie in the outermost first winding 2, R2 and L2 in the second winding 2, etc.

Figure 2:
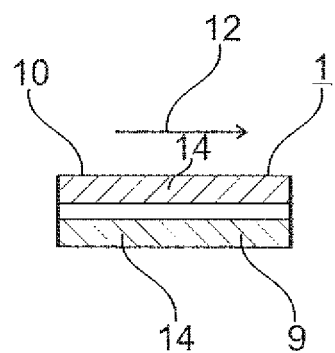
FIG. 2 shows the design of a sensor element in a sectional view in a schematic form.

FIG. 2 shows the basic design of a sensor element 1. Said sensor element comprises a ferromagnetic reference layer 9 and a likewise ferromagnetic sensitive layer 10, which are separated by a non-magnetic layer 11. Said layers 9, 10, 11 are so thin that the magnetization in the layers 9, 10 can be oriented in the longitudinal direction 12 and opposite to the longitudinal direction 12. Other possibilities that restrict the orientation of the magnetization in the layers 9, 10 are also possible according to the present disclosure. The sensitive layer 10 is—as FIG. 1 shows—joined to a domain wall generator 13. This is again designed, in particular not as thin as the layers 9, 10, so that the magnetization 14 can be oriented therein parallel to an external magnetic field (not shown).

Owing to the large magneto resistance, in this case the electrical resistance of such a sensor element 1—as also of the segment 4 of such a sensor element 1—is dependent on the orientations of the magnetizations 14 in the reference layer 9 and the sensitive layer 10. In the case of antiparallel orientation of the magnetization 14 in the reference layer 9 and the sensitive layer 10, as is shown in FIG. 2 the electrical resistance is significantly higher than in the case of parallel orientation of the magnetizations 14. In FIG. 1, the different resistances of the segments 3 are symbolized, wherein some segments 3 have a low resistance 15 and others have a high resistance 16. The sensitive layer 10 is joined to the domain wall generator 13 in this case.

In FIGS. 3 through 8, the principle of operation of the rotation sensor is now described. Here, for reasons of clarity not all elements are provided with reference characters, wherein identical elements are provided with the same reference characters and reference is made to the rest of the description in this document. FIG. 9 shows a table in which the measured group voltages at the different central measurement points L1, L2, L3, L4, R1, R2, R3, R4 are listed.

Figure 3:
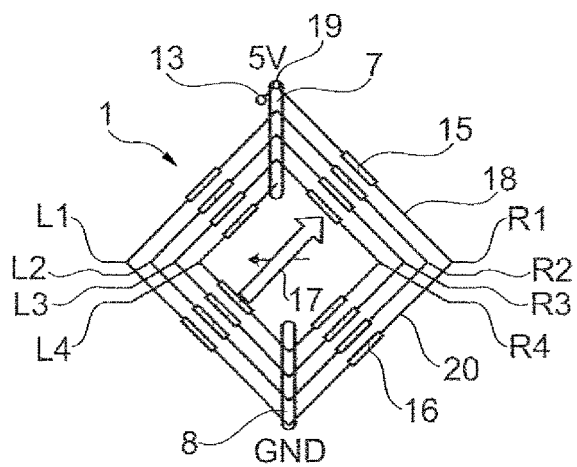
FIGS. 3 through 8 show by way of example the change in the resistances.
Figure 6:
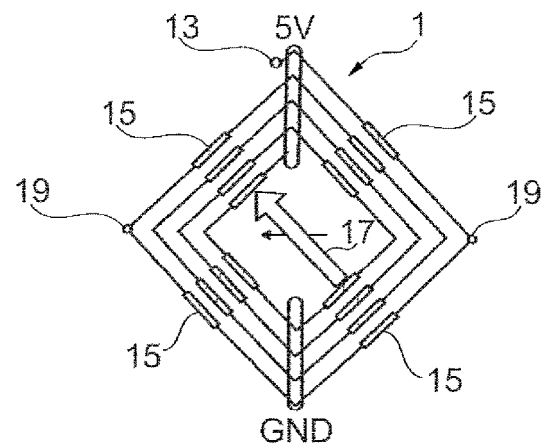
Figure 4:
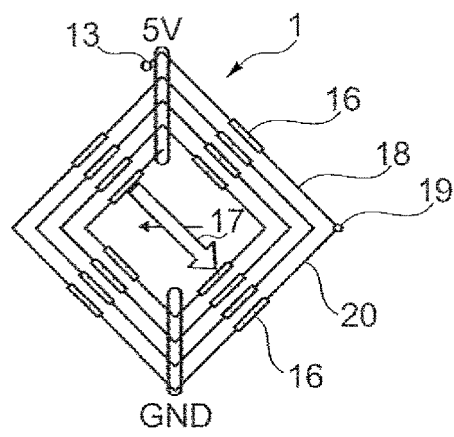

FIG. 3 shows a starting position with n=0 rotations. The magnetic field 17 of the trigger magnet points in the indicated direction in this case. On the central measurement points L1, L2, L3, L4, R1, R2, R3, R4, a low group voltage is measured. This is shown in FIG. 9 as "−" for the individual measurement points. The magnetization of the domain wall generator 13 is parallel to the magnetic field 17 of the trigger magnet in this case. Inversion of the magnetization in the first segment 18 does not occur because the magnetic field 17 is not oriented in parallel or antiparallel with the longitudinal direction in said first segment 18 and consequently the magnetization cannot "migrate" out of the domain wall generator into the first segment 18. This changes with termination of the first quarter rotation, i.e. at n=0.25 as shown in FIG. 4. Here the electrical resistance of the first segment changes to a high electrical resistance 16. This results in a central group voltage at the corresponding central electrical connection R1 (see symbol "o" in FIG. 9). Furthermore, there is a domain wall 19 (see FIG. 4). The remaining group voltages on the central electrical connections L1, R2, L2, R3, L3, R4, L4 remain low.

After a further quarter rotation (n=0.5, see FIG. 5) there is already a domain wall 19 in front of the first segment 18, whereas the previously existing domain wall 19 has moved further in said segment owing to the change of a further resistance of the second segment 20 owing to the magnetization in the sensitive layer 10 inverting. As a result, the group voltage on the central electrical connection R1 jumps to a high value (symbol "+" in FIG. 9), whereas all other group voltages remain at a low voltage ("−").

After a further quarter rotation (n=0.75, FIG. 6) the resistances in the first segment 18 and the third segment 21 change to a low electrical resistance 15, whereas the electrical resistance of the second segment 20 remains at a low electrical resistance 15. This is based on the inversion of the corresponding magnetization in the sensitive layers 10 of the corresponding segments owing to the now parallel orientation of the corresponding magnetizations in the sensitive layer 10 and the reference layer 9. Accordingly, the group voltages change to a medium voltage ("o" in FIG. 9) for the central electrical connections R1 and L1, whereas all other group voltages remain at a low voltage ("−"). The corresponding two domain walls 19 are shifted further by 90° in comparison to the situation in FIG. 5.

Figure 7:
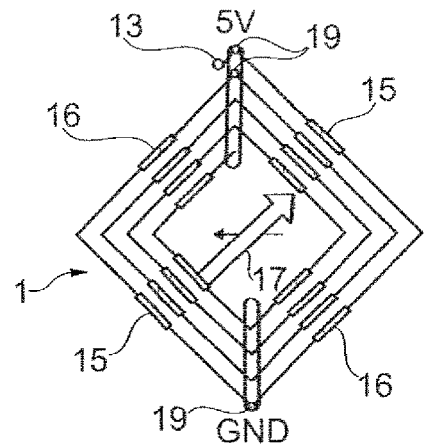
Figure 5:
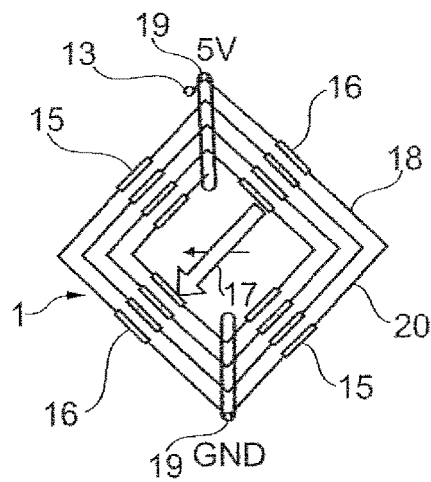
Figure 8:
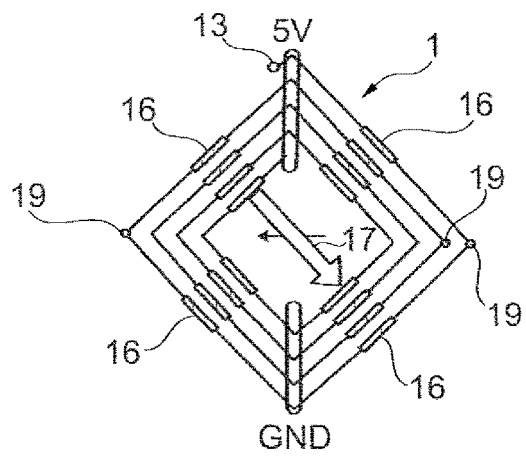

FIG. 7 shows the situation for a complete rotation (n=1), FIG. 8 for n=1.25 rotations. The corresponding inversion of the magnetizations, the related changes in resistance and the movement of the corresponding domain walls take place accordingly. In the table in FIG. 9, the corresponding group voltages for said rotations and for the further rotations of n=1.5 through n=4 can be read out.

From the schema in FIG. 9, it can be seen that the assignment of the group voltages on the central electrical resistances R1, L1, R2, L2, R3, L3, R4, L4 to the number of rotations n is one-to-one. Thus, during measurement of the corresponding group voltages, the direct determination of the number of rotations n is possible by comparison with a reference schema 21, as is schematically symbolized in FIG. 9.

Furthermore, it is also possible to determine the number of rotations n from the measurement of the group voltage on the central electrical connection R1 and certain summary results. Thus, for example, if a medium voltage ("o") is applied to R1 the following relationship applies:

$$n = \frac{n_o}{2} - 0.25$$

wherein $n_o$ gives the number of measured medium voltages ("o").

If there is a high voltage ("+") on R1, then the following relationship applies:

$$n = 2x - n_- = n_+ - 0.5$$

wherein $n_-$ is the number of measured low voltages ("−"), $n_+$ the number of measured high voltages ("+") and x the maximum number of rotations of the trigger magnet, which is four in the case of the example described here.

If there is a low voltage ("−") on R1, then the following relationship applies:

$$n = 2x - n_- = n_+$$

wherein $n_-$ is the number of measured low voltages ("−"), $n_+$ the number of measured high voltages ("+") and x the maximum number of rotations of the trigger magnet, which is four in the case of the example described here.

Using the relationships specified here, it is thus possible to simply calculate the number of rotations n with knowledge of the group voltage on the central electrical connection R1 and knowledge of the numbers of measured high voltages and low voltages.

Furthermore, it is also possible to detect malfunctions of the sensor element 1. For example, the reference schema 21 shows the right part of a region in which the corresponding central electrical connections continuously exhibit low group voltages. It is for example clear that there is a malfunction of the sensor element once a group voltage that is different from "low" is detected in said region. Likewise, it is clear that a malfunction exists if all possible voltages on all central electrical connections R1, L1, R2, L2, R3, L3, R4, L4 are tapped at the same time, i.e. high ("+"), medium ("o") and low ("−"), likewise a malfunction must exist if a medium group voltage and a high group voltage exist at the same time.

Figure 10:
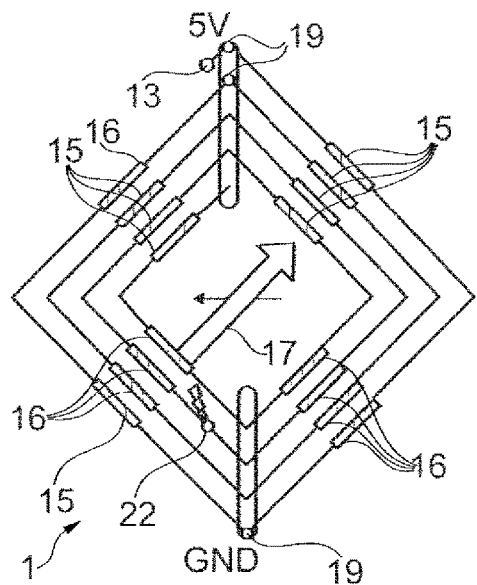
FIGS. 10 through 12 show schematically an image of the resistances of the sensor element of FIG. 1 in the presence of an error for n=1, 1.25, 1.5, 1.75.
Figure 11:
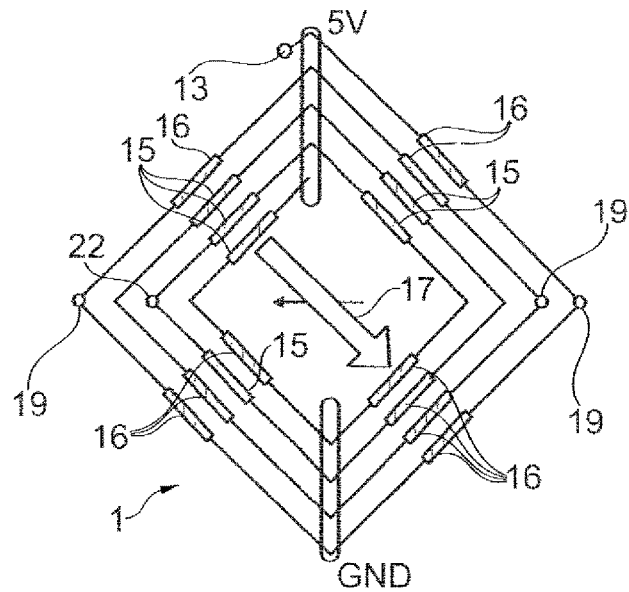
Figure 12:
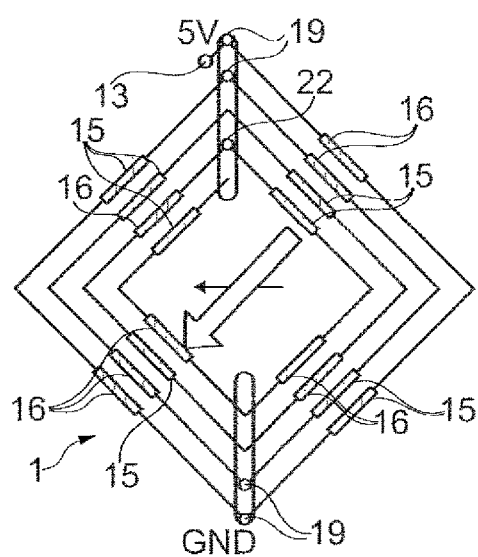
Figure 13:
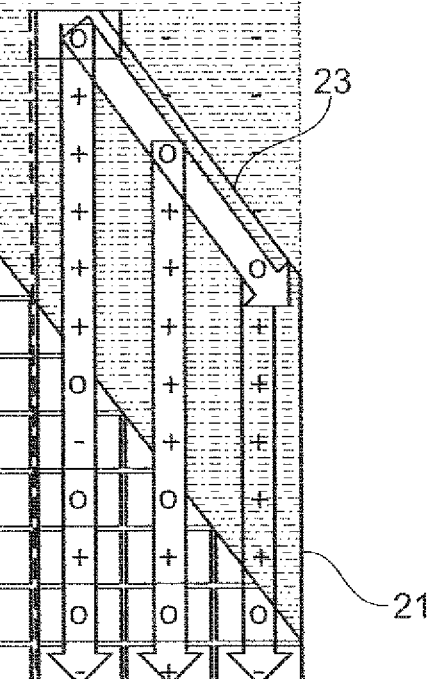
FIG. 13 shows a reference schema for the example of FIGS. 10 through 12.

FIGS. 10 through 12 show schematically the operation of the sensor element 1 for numbers of revolutions of n=1 (FIG. 10), n=1.25 (FIG. 11) and n=1.5 (FIG. 12). For n=1 a fault 22 develops or appears. This does not affect the measured resistances, which correspond to those of FIG. 7. The measured group voltages are identical, as the reference schema 21 in FIG. 13 for this example shows. For n=1, the values from FIG. 13 and FIG. 9 are identical. The fault 22 represents for example a domain wall that arises unintentionally.

For a further quarter rotation (cf FIG. 11), a difference can be detected, as the comparison with FIG. 8 and a comparison of the rows for n=1.25 between the reference schemas 21 in FIGS. 9 and 13 show. With the fault 22, there is a medium group voltage on the central electrical connection L3, whereas without the fault there is a low group voltage. Said fault 22 is moved further through the sensor element 1, as FIG. 12 for n=1.5 shows. As a result, a high group voltage is measured on the central electrical connection L3, whereas without the fault a low group voltage would be measured. This also shows a comparison of the reference schemas in FIGS. 9 and 13. As FIG. 13 further shows, this behavior continues. The fault 22 results in erroneous group voltages in the region of the central electrical connection L3, but also the subsequent central electrical connections R4, L4, as the correspondingly marked faulty regions 23 of the reference schema 21 of FIG. 13 show.

The comparison of the reference schemas 21 in FIGS. 9 and 13 also shows further possibilities for fault detection. The reference schemas 21 show the group voltages as a function of the number of rotations n, wherein the individual central electrical connections R1, L1, R2, L2, R3, L3, R4, L4 are listed in the columns of the table of the reference schemas 21 as a function of the distance thereof from the first segment 18 or from the domain wall generator 13. In this respect, central electrical connections listed in adjacent columns are thus also adjacent central electrical connections that belong to adjacent groups 4 of segments 3. Thus, for example, there is a fault if a central electrical connection R1, L1, R2, L2, R3, L3, R4, L4 has a high group voltage and an adjacent central electrical connection R1, L1, R2, L2, R3, L3, R4, L4 has a medium group voltage. The same applies that there is a fault if a central electrical connection R1, L1, R2, L2, R3, L3, R4, L4 has a medium group voltage and an adjacent central electrical connection R1, L1, R2, L2, R3, L3, R4, L4 has a high group voltage. A further rule for locating faults is that there must be a fault if two successive central electrical connections R1, L1, R2, L2, R3, L3, R4, L4 have a low group voltage and subsequent central electrical connections have a group voltage that is not a low group voltage.

This also shows that using said rules, the fault in FIG. 13 can be found easily and in a timely manner. Already at n=1.25, the fault is detected according to the last-named rule, from n=1.75 also by the aforementioned rules.

Figure 14:
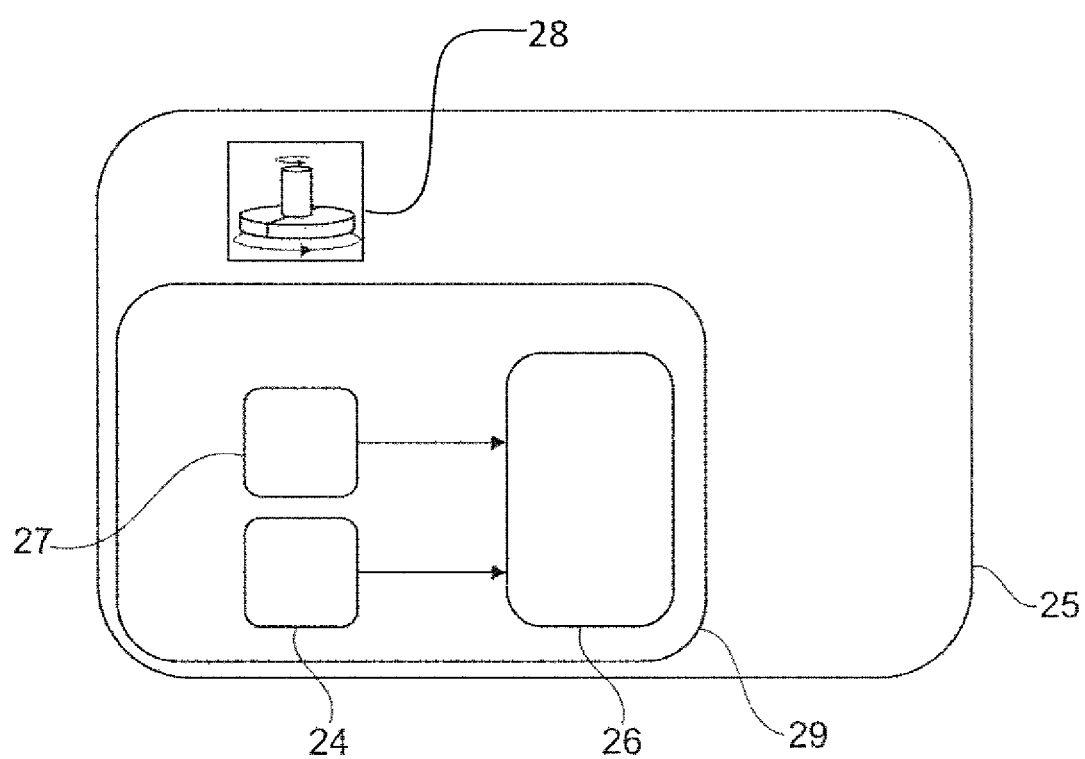
FIG. 14 shows a rotation sensor in a schematic form.

FIG. 14 shows schematically a rotation sensor 24 that monitors the rotation in an actuator 25. The rotation sensor 24 is connected to an analysis device 26 to which the group voltages are transmitted. In the analysis device 26, a calculation of the number of rotations n based on the sensed group voltages, looking up the number of rotations n based on the sensed group voltages, for example in a reference schema 21, and/or fault detection as set out above are carried out.

Furthermore, a second rotation sensor 27 is implemented, which is a so-called single-turn sensor, i.e. a sensor that can only sense rotations of a maximum of 360°. The second rotation sensor 27 is also connected to the analysis device 26, so that the data of the second rotation sensor 27 can also be processed by the analysis device 26. In particular, the data of the second rotation sensor 27 can be correlated with the data of the rotation sensor 22.

Both the rotation sensor 22 and the second rotation sensor 27 sense the rotation of a trigger magnet 28 in this case, which is implemented as a permanent magnet. Said trigger magnet is connected to the rotatable component (here a part of the actuator 25), the rotation of which is to be monitored. The rotation sensor 22, the second rotation sensor 27 and the analysis device 26 can be pre-mounted as a unit 29 in order to enable simpler assembly of the rotation sensor 22.

Figure 15:
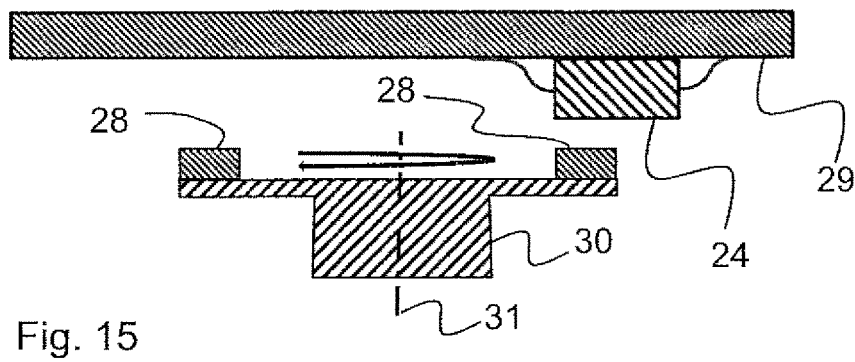
FIGS. 15 and 16 show a first example of an arrangement of a rotation sensor relative to a trigger magnet in a schematic form.
Figure 16:
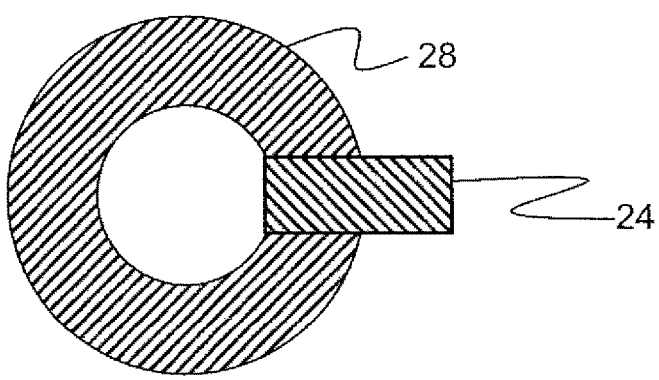

FIGS. 15 and 16 show schematically a first example of a rotation sensor 24 that is part of a unit 29. This senses as described above the rotation of a trigger magnet 28 that is rotationally fixedly joined to a rotatable component 30. The rotation of the rotatable component 30 is indicated here as an arrow in FIG. 15. In this example, the rotation sensor 24 is not disposed coaxially with the axis of rotation 31 of the rotatable component 30 ("off-axis"). The trigger magnet 28 is of annular form. Circular, square or rectangular designs of the trigger magnet 28 are also possible according to the present disclosure. FIG. 16 shows the arrangement of the rotation sensor 24 relative to the trigger magnet 28.

Figure 17:
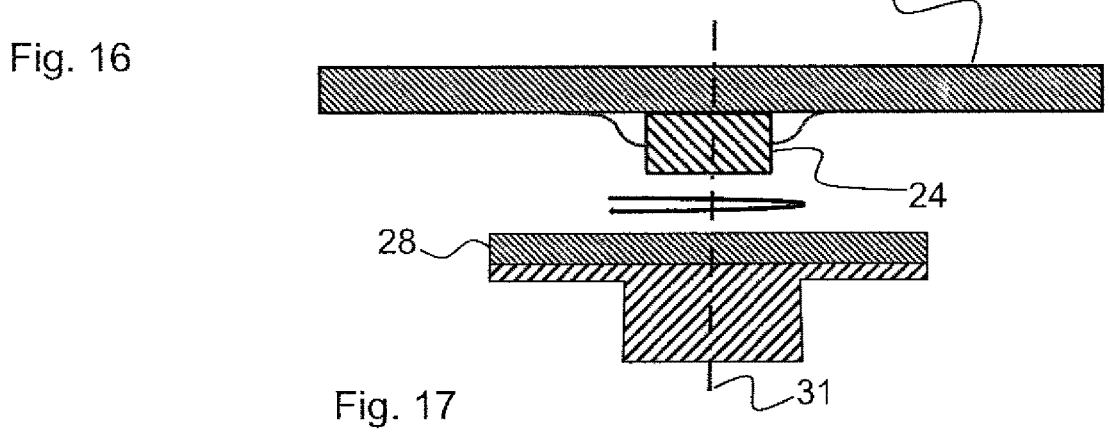
FIGS. 17 and 18 show a second example of an arrangement of a rotation sensor relative to a trigger magnet in a schematic form.
Figure 18:
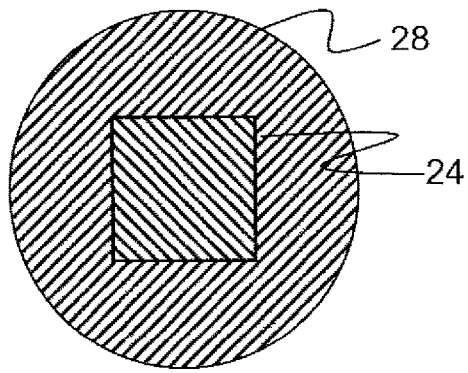

FIGS. 16 and 17 show schematically a second example of a rotation sensor 24 as part of a unit 29. Said sensor 24 senses as described above the rotation of a trigger magnet 28 that is rotationally fixedly joined to a rotatable component 30. In this case, the rotation of the rotatable component 30 is indicated by an arrow in FIG. 17. In this example, the rotation sensor 24 is disposed coaxially to the axis of rotation 31 of the rotatable component 30 ("on-axis"). The trigger magnet 28 is of circular form here, and a square or rectangular implementation is possible according to the present disclosure. FIG. 18 shows the arrangement of the rotation sensor 24 relative to the trigger magnet 28.

The rotation sensor described here and the corresponding described method enable the rapid read-out or look-up of the currently achieved number of rotations n and the location of faults. After a fault has been detected, either the user can be made aware of the existence of a fault by a fault signal, or a fault correction can be initiated by the fault signal. The rotation sensor described here and the corresponding method can be used if the number of rotations of rotating parts must be detected, in particular over a range greater than 360°, for example with actuators in automotive construction, but also in particular automotive engineering for the measurement of rotation angles, for example for steering angles (in particular in the case of power steering), in the measurement of deflections of headlamps, in seat position adjustment and similar. Outside of automobile construction, for example in industrial applications, the monitoring of the rotation of axles of production lines or of machine tools is possible, likewise the monitoring of fork lift positions in forklift trucks.

REFERENCE CHARACTER LIST 1 sensor element
2 winding
3 segment
4 group
5 outer electrical connection
6 central electrical connection
7 first electrical potential
8 second electrical potential
9 ferromagnetic reference layer
10 ferromagnetic sensitive layer
11 non-magnetic layer
12 longitudinal direction
13 domain wall generator
14 magnetization
15 low electrical resistance
16 high electrical resistance
17 magnetic field
18 first segment
19 domain wall
20 second segment
21 reference schema
22 fault
23 faulty region
24 rotation sensor
25 actuator
26 analysis device
27 second rotation sensor
28 trigger magnet
29 unit
30 rotatable unit
31 axis of rotation
α angle size
n number of rotations
x number of windings

The invention claimed is:

1. A rotation sensor comprising:
a magnetoresistive sensor element with:
a packet comprising:
a ferromagnetic reference layer;
a sensitive ferromagnetic layer; and,
a non-magnetic layer separating the ferromagnetic reference layer and the sensitive ferromagnetic layer, the ferromagnetic reference layer and the sensitive ferromagnetic layer comprising respective longitudinal directions and magnetizable only in their respective longitudinal directions;
a domain wall generator comprising a ferromagnetic material that enables free orientation of magnetization of the domain wall generator; and,
a rotatable trigger magnet; wherein:
the magnetoresistive sensor element has a planar, spiral form with a plurality of concentrically formed windings, each complete winding comprising a plurality of segments enclosing respective angles;
the sensitive ferromagnetic layer is joined to the domain wall generator at a first one of the plurality of segments;
the rotatable trigger magnet is rotatable relative to the segments to change magnetization in the sensitive ferromagnetic layer of at least one of the segments;
each two adjacent segments comprise a group with respective outer electrical connections and a common central electrical connection;
a one of the outer electrical connections lies at a first electrical potential and the other of the outer electrical connections lies at a second electrical potential with a defined potential difference from the first electrical potential; and,
the first electrical potential or the second electrical potential is defined as an electrical ground.

2. A method for operating the rotation sensor of claim 1, comprising:
measuring a voltage between the common central electrical connection and the electrical ground for each group of two adjacent segments; and,
recording each voltages for analysis of a state of the rotation sensor.

3. The method as claimed in claim 2, further comprising:
assigning each voltages to one of three potential levels.

4. The method as claimed in claim 2, further comprising:
comparing each voltages with a reference schema to determine a rotation angle of the rotatable trigger magnet.

5. The method as claimed in claim 2, further comprising:
outputting an error signal if at least one of each voltages indicates a measurement error.

6. The method as claimed in claim 2, further comprising correlating each voltages with a rotation angle of a second rotation sensor that can detect rotations up to 360°.

7. The rotation sensor as claimed in claim 1, wherein at least one complete winding of the plurality of concentrically formed windings comprises a number of segments that is an integral multiple of four.

8. A method of operating the rotation sensor of claim 1, comprising:
providing a voltage measurement unit and an analysis device;
measuring a voltage between the common central electrical connection and the electrical ground with the voltage measurement unit for each group of two adjacent segments; and,
analyzing the voltages with the analysis device to determine a state of the rotation sensor.

9. The method as claimed in claim 8, further comprising:
connecting a second rotation sensor to the analysis device via at least one signal line, wherein the second rotation sensor can detect rotations up to 360°.

10. The rotation sensor of claim 1, wherein
the rotatable trigger magnet is rotatable about an axis of rotation; and
the axis of rotation is coaxial with the rotation sensor.

11. The rotation sensor of claim 1, wherein
the rotatable trigger magnet is rotatable about an axis of rotation; and
the axis of rotation is disposed outside the rotation sensor.

12. A method of operating a rotation sensor comprising:
providing:
a rotation sensor comprising a first axis and a plurality of spiral windings;
each spiral winding comprising a first group and a second group;

each group comprising a first group end, a second group end, a first segment, and a second segment;

each segment comprising a first segment end aligned with the first group end or the second group end, a second segment end aligned with the second segment end of an adjacent segment, and a sensor element; and, the sensor element comprising a ferromagnetic sensitive layer and a ferromagnetic reference layer separated by a nonmagnetic layer;

a domain wall generator connected to the first group end of the first group, the domain wall generator comprising a magnetizable ferromagnetic material; and, a rotatable trigger magnet;

connecting the first group ends to a supplied voltage and the second group ends to an electrical ground;

measuring a voltage between the second segment end of the first segment of the first group and the second segment end of the first segment of the second group; and, storing the voltage for analysis of a state of the rotation sensor.

13. The method of claim 12, further comprising:
assigning each voltage to a potential level having a first, a second, or a third value.

14. The method as claimed in claim 13, further comprising:
comparing the potential level of each voltage with a reference schema to determine a rotation angle of the rotatable trigger magnet.

15. The method as claimed in claim 14, further comprising:
outputting an error signal if the potential level of the voltage indicates a measurement error when the potential level is compared with the reference schema.

16. The method of claim 12, wherein each of the plurality of spiral windings comprises a number of segments that is an integral multiple of four.

17. The method of claim 12, further comprising:
providing a second rotation sensor that can detect rotations up to 360°;
measuring a rotation angle with the second rotation sensor; and,
correlating the voltage with the rotation angle.

18. The method of claim 12, wherein:
the rotatable trigger magnet is rotatable about a second axis; and,
the second axis is coaxial with the first axis.

19. The method of claim 12, wherein:
the rotatable trigger magnet is rotatable about a second axis; and,
the second axis is offset from the first axis.

* * * * *